United States Patent
Sun

(10) Patent No.: US 10,318,149 B2
(45) Date of Patent: Jun. 11, 2019

(54) METHOD AND APPARATUS FOR PERFORMING TOUCH OPERATION IN A MOBILE DEVICE

(71) Applicants: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(72) Inventor: Hui Sun, Qingdao (CN)

(73) Assignees: HISENSE MOBILE COMMUNICATIONS TECHNOLOGY CO., LTD., Shandong (CN); HISENSE USA CORPORATIONGA (US); HISENSE INTERNATIONAL CO., LTD., Shandong (CN)

( * ) Notice: Subject to any disclaimer, the term of this patent is extended or adjusted under 35 U.S.C. 154(b) by 179 days.

(21) Appl. No.: 15/394,686

(22) Filed: Dec. 29, 2016

(65) Prior Publication Data

US 2017/0315720 A1  Nov. 2, 2017

(30) Foreign Application Priority Data

Apr. 29, 2016 (CN) .......................... 2016 1 0284866

(51) Int. Cl.
*G06F 3/0488* (2013.01)
*G06F 3/0481* (2013.01)
*G06F 3/0482* (2013.01)

(52) U.S. Cl.
CPC ........ *G06F 3/04883* (2013.01); *G06F 3/0481* (2013.01); *G06F 3/0482* (2013.01);
(Continued)

(58) Field of Classification Search
CPC ............... G06F 3/04883; G06F 3/0481; G06F 2203/04804; G06F 2203/04803
See application file for complete search history.

(56) References Cited

U.S. PATENT DOCUMENTS

| 7,415,676 B2 * | 8/2008 | Fujita ................... G06F 3/0481 715/781 |
| 2005/0110768 A1 * | 5/2005 | Marriott .............. G06F 3/03547 345/173 |

(Continued)

FOREIGN PATENT DOCUMENTS

| CN | 103955339 A | 7/2014 |
| WO | WO 2015/079700 A1 | 6/2015 |

OTHER PUBLICATIONS

The Chinese First Examination Report of corresponding China patent application No. 201610284866.9, dated Aug. 1, 2018.

Primary Examiner — Anil K Bhargava
(74) Attorney, Agent, or Firm — J.C. Patents

(57) ABSTRACT

The disclosure provides a method and an apparatus for performing a touch operation in a mobile device, the method includes: activating a target operation mode when monitoring a first target operation in a first user interface; mapping a first touch operation event occurring in a first position to a second touch operation event occurring in a second position in the target operation mode; and reporting the second touch operation event occurring in the second position to the first user interface for performing a corresponding operation. By mapping position in an operable area, operation on an area inoperable with one hand of user is realized, avoiding click-help from another hand and improving simplicity and efficiency of touch operations. Since there is no need to perform transformation operations such as zooming (Continued)

on first user interface, user can operate directly, reducing probability of error due to position error after transformation.

14 Claims, 4 Drawing Sheets

(52) U.S. Cl.
CPC .. *G06F 3/0488* (2013.01); *G06F 2203/04803* (2013.01); *G06F 2203/04804* (2013.01)

(56) References Cited

U.S. PATENT DOCUMENTS

| | | | |
|---|---|---|---|
| 2009/0262086 A1* | 10/2009 | Chen | G06F 3/03547 345/173 |
| 2010/0100849 A1* | 4/2010 | Fram | G06F 3/0236 715/835 |
| 2012/0044164 A1* | 2/2012 | Kim | G06F 3/04842 345/173 |
| 2013/0131986 A1* | 5/2013 | Van Seggelen | G01C 21/3484 701/533 |
| 2015/0100910 A1* | 4/2015 | Luo | G06F 3/04883 715/771 |
| 2015/0205522 A1* | 7/2015 | Zeng | G06F 3/04886 715/847 |
| 2015/0324087 A1* | 11/2015 | Gregory | G06F 3/0488 345/174 |
| 2015/0355735 A1* | 12/2015 | Matsuda | G06F 3/0488 345/162 |

* cited by examiner

METHOD AND APPARATUS FOR PERFORMING TOUCH OPERATION IN A MOBILE DEVICE

CROSS-REFERENCE TO RELATED APPLICATIONS

This application claims priority to Chinese Patent Application No. 201610284866.9, filed on Apr. 29, 2016, entitled "METHOD AND APPARATUS FOR PERFORMING TOUCH OPERATION IN A MOBILE DEVICE", which is hereby incorporated by reference in its entirety.

TECHNICAL FIELD

The present disclosure relates to the field of mobile device technologies and, more particularly, to a method for performing a touch operation in a mobile device and an apparatus for performing a touch operation in a mobile device.

BACKGROUND

With the development of science and technology, various terminals, especially mobile devices such as mobile phones and tablet computers, have been more and more frequently used in people's work, study, daily communication and so on.

In order to facilitate the reading and viewing of a user, the screen of the mobile device is getting larger and larger.

However, when the screen of the mobile device is relatively large, the one-handed operation performed by the user becomes more and more inconvenient.

For example, when the user holds a mobile device in his right hand and needs to operate at the upper left of the screen, it is hard for him to click with the right hand. If clicking with a single palm, the user may erroneously operate.

SUMMARY

Embodiments of the present disclosure provide a method for performing a touch operation in a mobile device and a corresponding apparatus for performing a touch operation in a mobile device.

An embodiment of the present disclosure discloses a method for performing a touch operation in a mobile device, including:
  activating a target operation mode when monitoring a first target operation in a first user interface;
  mapping a first touch operation event occurring in a first position to a second touch operation event occurring in a second position in the target operation mode; and
  reporting the second touch operation event occurring in the second position to the first user interface for performing a corresponding operation.

An embodiment of the present disclosure discloses an apparatus for performing a touch operation in a mobile device, including:
  a memory, configured to store instructions; a processor coupled to the memory, the processor is configured to execute the instructions stored in the memory, and the processor is configured to:
  activate a target operation mode when monitoring a first target operation in a first user interface;
  map a first touch operation event occurring in a first position to a second touch operation event occurring in a second position in the target operation mode; and
  report the second touch operation event occurring in the second position to the first user interface for performing a corresponding operation.

DESCRIPTION OF EMBODIMENTS

For a more clear understanding to the above objectives, features and advantages, the present disclosure will be described in further detail below with reference to the accompanying drawings and embodiments.

Figure 1:
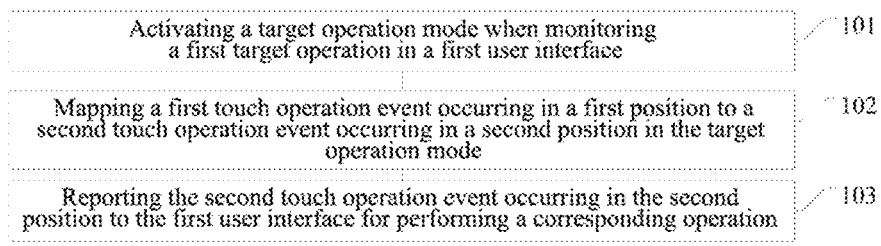
FIG. 1 is a flowchart of steps in a method for performing a touch operation in a mobile device provided by some embodiments of the present disclosure.

Referring to FIG. 1, which is a flowchart of steps in a method for performing a touch operation in a mobile device provided by some embodiments of the present disclosure. The method includes the following steps.

Step 101: activating a target operation mode when monitoring a first target operation in a first user interface.

It should be noted that embodiments of the present disclosure can be applied into electronic devices having a display screen, which may include mobile devices such as mobile phones, tablet computers, personal digital assistants, wear devices (such as eyeglasses, watches, etc.) and the like, and may also include fixed devices such as TVs, personal computers and the like.

The operating systems of these electronic devices may include Android, IOS, Windows Phone, Windows, and the like.

In order to enable those skilled in the art to better understand embodiments of the present disclosure, Android is taken as an example of the operating system in the present specification.

In a mobile device on which a touch operation can be performed, the screen thereof generally includes a display screen and a touch screen.

The display screen may display a user interface (UI) element, such as a window (including a control), on a screen, and may include an LCD (liquid crystal display) display screen, an LED (light-emitting diode) display screen and so on.

The touch screen may also be referred to as a "touch-control screen" or a "touch panel", which is an inductive liquid crystal display apparatus that can receive input signals such as contacts, and may include a vector pressure sensing-technology touch screen, a resistive-technology touch screen, a capacitor-technology touch screen, an infrared-technology touch screen, a surface acoustic wave-technology touch screen, and the like, and the present disclosure is not limited thereto.

In most cases, the touch screen is attached to the display screen, and if the position of a touch point on the touch screen can be measured, the user's intention can be learned from the user interface element at the corresponding position on the display screen, such as closing, confirming, return, and so on.

Figure 2A:
FIGS. 2A-2C are exemplary views of a one-handed touch operation provided by some embodiments of the present disclosure.

In an embodiment of the present disclosure, as shown in FIG. 2A, the elements such as an application icon, a folder, a floating control (a circular control) may be displayed in the first user interface.

The floating control is a button at the uppermost layer of a basic operation interface, and can be floated on most of the user interfaces except for applications such as games and video players.

Taking the Android system as an example, a control, namely, PopupWindow, can be used to set the floating control, and there are two ways of showing this control:
one way is using showAsDropDown (View v) method, displaying the PopupWindow as a drop-down component of the v component;
another way is using showAtPosition( ) method, displaying the PopupWindow at the specified position.

Of course, in addition to the PopupWindow, there may also be other ways for setting the floating controls, and embodiments of the present disclosure are not limited thereto.

The floating control may respond to the user's operations, such as clicking, long pressing, heavy pressing, and the like.

Figure 2B:

As shown in FIG. 2B, when the user clicks on the floating control, a series of pop-up menus can occur to facilitate the user's operations such as junk cleaning, screen locking, playing, shortcut panel pulling-down and the like.

In the embodiment of the present disclosure, if the user cannot easily perform the touch operation with one hand, the first target operation may be triggered, and the target operation mode, i.e., a mode in which the touch operation is performed easily with one hand, may be activated.

If the mobile device has a floating control, the first target operation may be a specified operation for the floating control, for example, long pressing (the pressing time exceeds a preset time threshold) the floating control, heavy pressing (the pressing pressure exceeds a preset pressure threshold) the floating control, and so on.

Of course, the above-described first target operation is merely an example, and other first target operations may be set according to the actual situation when implementing embodiments of the present disclosure, such as a specified swipe gesture operation, clicking on a specified control in a shortcut panel, and the like, and embodiments of the present disclosure are not limited thereto. Furthermore, in addition to the above-described first target operations, those skilled in the art may employ other first target operations according to actual needs, and embodiments of the present disclosure are not limited thereto.

When the target operating mode is activated, threads of certain modules may be started, the initialization may be performed, and the procedure of the touch operation may be changed.

Step 102: mapping a first touch operation event occurring in a first position to a second touch operation event occurring in a second position in the target operation mode;

The touch screen may be composed of a touch detection component and a touch screen controller. In the target operation mode, the touch detection component is installed in front of the screen, and the touch detection component may detect a touch operation event triggered by a user operation, then receive and transmit the touch operation event to the touch screen controller.

A down-event (Down) may refer to no-moving and no-releasing after pressing on the touch screen, a move-event may refer to moving (or sliding) after pressing on the touch screen, and an up-event may refer to releasing from the touch screen.

The touch screen controller may convert a touch signal into a position (e.g., X-coordinate and Y-coordinate).

In an embodiment of the present disclosure, due to the one-hand operable area being limited, a first touch operation event occurring at a first position within the one-hand operable area may be mapped to a second touch operation event occurring at a second position which is located in an area other than the one-hand operable area.

The first position is a true touch point, and the second position is a virtual touch point, i.e. a touch operation at a true touch point is mapped to a touch operation at a virtual touch point.

Figure 3:
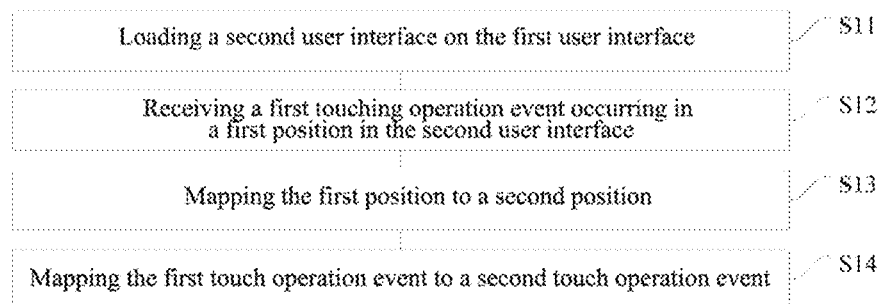
FIG. 3 is a flowchart of steps for mapping a first touch operation event occurring in a first position to a second touch operation event occurring in a second position provided by some embodiments of the present disclosure.

In an embodiment of the present disclosure, as shown in FIG. 3, the step 102 may include the following sub-steps.

Sub-step S11: loading a second user interface on the first user interface.

In the embodiment of the present disclosure, a transparent second user interface without a border may be loaded on the first user interface such that the second user interface is located at the uppermost layer of the operating system.

For example, in the Android system, the android:background="#00000000" may be set in the window property of the second user interface to make the second user interface transparent.

Because the second user interface is transparent, the first user interface under the second user interface is still visible, thus the second user interface will not affect the user's operation on the first user interface in visual effect.

Additionally, the size of the second user interface may be equal to the screen size of the mobile device, avoiding misoperation in the first user interface.

For example, in the Android system, the android:layout_width="fill_parent" and the android:layout_height="fill_parent" may be set in the window property of the second user interface, such that the size of the second user interface is the same as the screen size of the mobile device.

Of course, the second user interface may also be smaller than the screen of the mobile device, for example, the second user interface may be a floating control, and so on, and the embodiments of the present disclosure are not limited thereto.

Sub-step S12: receiving a first touching operation event occurring at a first position in the second user interface.

In some implementations, the user may operate in the second user interface and trigger the first touch operation event, such as an up-event, a heavy pressing-event, a double clicking-event, and so on.

Figure 2C:

In one example, if the size of the second user interface is equal to the screen size of the mobile device, and the mobile device has a floating control that is distinct from the second user interface, then in the target operation mode, the original position of the floating control (i.e., a hollow circle as shown in FIG. 2C) may be recorded in the second user interface. The user can press and move the floating control represented by a solid circle.

Sub-step S13: mapping the first position to a second position.

In some implementations, the second user interface includes a plurality of divided areas, which may include a touch area and a mapping area. The touch area is generally the area where the user can operate with one hand, and the mapping area is generally the area where the user cannot operate with one hand. For the ease of mapping, the touch area is generally proportional to the size of the screen. Herein, the direction of the touch area can be determined according to the using patterns of the mobile device (such as landscape and portrait screen) and the user's hand (such as left hand and right hand).

Figure 4:
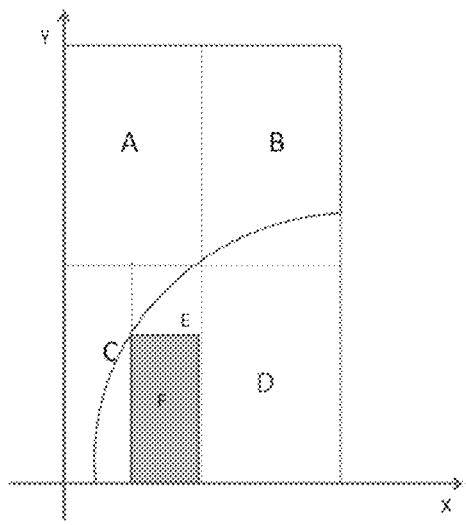
FIG. 4 is an exemplary view of a divided area provided by some embodiments of the present disclosure.

For example, as shown in FIG. 4, the second user interface includes a divided area A, a divided area B, a divided area C, and a divided area D. If the user operates in a portrait mode (i.e. a vertical screen mode) with only the right hand, then the one-hand operable area is the area within the arc, that is to say, the area F in the divided area C and the divided area D belong to the touch area, the divided area A and the divided area B belong to the mapping area, while the area E in the divided area C belongs to neither the touch area nor the mapping area.

In addition, the touch area may be the default or may be adjusted according to information on customary of the user's touch operation, and the embodiments of the present disclosure are not limited thereto.

In an embodiment of the present disclosure, the sub-step S13 may include the following sub-steps.

Sub-step S131: determining a touch area which the first position belongs to.

In one case, when the first position is within the touch area, it is determined that the first position belongs to that touch area.

For example, as shown in FIG. 4, if the first position is within the touch area D or a touchable area E, it may be determined that the first position belongs to the touch area D or the area E.

Or, in another case, when the first position is within the divided area but is not within the touch area in the divided area, then the first position can be projected onto the boundary of the touch area in the divided area, meanwhile, it is also determined that the first position belongs to the touch area.

For example, as shown in FIG. 4, if the first position is within the area E of the divided area C but is not within the touch area F in the divided area C, then the first position can be vertically projected onto the boundary of the touch area F, that is to say, the X-coordinate or the Y-coordinate is set as the X-coordinate or the Y-coordinate of the boundary of the touch area F, and it is determined that the first position belongs to the touch area F.

Sub-step S132: querying a ratio relation between the touch area and the screen size.

In some implementations, the touch area is generally proportional to the screen, i.e., the ratio relation between the two may include a height ratio, a width ratio, and the like.

Sub-step S133: mapping the first position to a second position in the mapping area according to the ratio relation.

In some implementations, the first position includes a first abscissa (e.g., X-coordinate) and a first ordinate (e.g., Y-coordinate), and the second position includes a second abscissa (e.g., X-coordinate) and a second ordinate (e.g., Y-coordinate).

In one example, when the touch area is a divided area, the value of first abscissa may be assigned to the second abscissa, and the sum of the value of first ordinate and a height scale value may be assigned to the second ordinate.

The height scale value is a product of the screen height and the height ratio.

For example, as shown in FIG. 4, it is assumed that the first position of the user's true touch point is $M(x_m, y_m)$ and the second position of the outputted virtual touch point is $N(x_n, y_n)$.

In the case that the touch point is within the touch area D, since the lengths of the touch area D and the mapping area B in the X-axis direction are the same, i.e., $x_n=x_m$, then the height ratio of the mapping area B to the touch area D in the Y-axis direction is a, i.e., $y_n=ay_m$.

Assuming that the height of the touch area D is half of the screen height, and the screen height is h, then the coordinate of the second position is $N(x_n, y_n)=(x_m, 0.5\ h+y_m)$.

Or, in another example, when the touch area is a partial area in the divided area, the first abscissa and the first ordinate may be mapped as a third abscissa and a third ordinate of the divided area according to the ratio relation between the touch area and the divided area, The value of third abscissa is assigned to the second abscissa, and the sum of the value of third ordinate and the height scale value is assigned to the second ordinate.

The height scale value is a product of the screen height and the height ratio.

For example, as shown in FIG. 4, it is assumed that the first position of the user's true touch point is $M(x_m, y_m)$ and the second position of the outputted virtual touch point is $N(x_n, y_n)$.

If the user's finger (e.g., the thumb) operates in the divided area C, such as dragging the floating control as shown in FIG. 2C, since the finger cannot cover the entire positions of the divided area C, the touch area F will be bounded from the area C.

If the width ratio of the mapping area A to the touch area F in the X-axis direction is a and the height ratio of the mapping area A to the touch area F in the Y-axis direction is b, then the point N is obtained as $(ax_n, by_n)$ by using equal proportion.

Assuming that the height and the width of the screen are h and w respectively, the width of the touch area F is 0.25 w, and the height of the touch area F is 0.3 h.

Then, the second position of the mapping area A is $N(x_n, y_n)$, where $x_n=2\cdot(x_m-0.25\ w)$ and $y_n=0.5\ h+(5/3\ y_m)$.

Of course, the above-mentioned mapping manners of positions are only examples. When implementing the embodiments of the present disclosure, other mapping manners of positions may be set according to the actual situation, for example, dividing into one touch area for mapping, dividing into three touch areas for mapping, and so on, which are not limited in this disclosure. Furthermore, in addition to the above-mentioned mapping manners of the positions, those skilled in the art can employ other mapping manners of the positions according to actual needs, which are also not limited in this disclosure.

Sub-step S14: mapping the first touch operation event to a second touch operation event.

In an embodiment of the present disclosure, position prompt information may be displayed at the second position, facilitating the user's operation.

The prompt information may be an icon, a text, or other data, and the embodiments of the present disclosure are not limited thereto.

For example, as shown in FIG. 2C, if the second position is located on the application icon "Mobile Manager", then a circular icon may be displayed on the application icon "Mobile Manager" as the prompt information.

With the embodiments of the present disclosure, a mapping relation between the touch operation events may be set in advance, and the first touch operation event may be mapped into the second touch operation event in accordance with the mapping relation.

If the mobile device includes a floating control, the first touch operation event may occur in the floating control.

For example, as shown in FIG. 2C, if the user moves the floating control and then releases the finger, an Up-event is generally generated and may be mapped to an onClick-event for activating an application which the icon "Mobile Manager" belongs to.

Of course, the above-described mapping manners of touch events are only examples. When implementing the embodiments of the present disclosure, other mapping manners of touch events may be set according to the actual situation. For example, if the user presses his finger heavily, a heavy pressing-event is generally generated and may be mapped to an onClick-event, and so on, which are not limited in this disclosure. Furthermore, in addition to the mapping manners of the touch events described above, those skilled in the art can also employ other mapping manners of touch events according to the actual needs, which are also not limited in this disclosure.

Step 103: reporting the second touch operation event occurring in the second position to the first user interface for performing a corresponding operation.

In some implementations, the second position and the second touch operation event may be reported to the first user interface, then an operation object (such as a control, an application icon, a folder, etc.) located at the second position of the first user interface may be operated in accordance with the second touch operation event, for example, activating an application, opening a folder, and so on.

In the Android system, the user interface is composed of View, ViewGroup and their derived classes.

The distribution of the touch operation event in Android is to deliver the captured touch operation event layer upon layer according to a certain rule until corresponding monitoring or callback function responds and handles the event.

The processing rule for the touch operation event, in one word, is "bubbling", which is to say, starting from the minimum View unit of an event source, bubbling outwardly, and passing the event layer upon layer.

Taking the simulation of an onClick( ) event as an example, the Instrumentation class containing sendPointerSync( ) method for distributing the touch operation event can be used for reporting.

A click-event can be generated at the coordinate point(x, y) by sending a MotionEvent.ACTION_DOWN event and a MotionEvent.ACTION_UP event.

Of course, when monitoring a second target operation, the target operation mode is withdrawn, such as withdrawing the threads of some modules, etc., and the normal touch operation is resumed.

In one example, as shown in FIG. 2C, the second target operation may be that the floating control returns to the original position where the floating control is located in when the target operation mode is activated.

Of course, in addition to the floating control, other second target operations, such as double-clicking the screen, etc., may also be set and the embodiments of the present disclosure are not limited thereto.

In the embodiments of the present disclosure, when the first target operation is monitored, the target operation mode is activated to facilitate the one-handed operation. In such mode, the first touch operation event occurring in the first position is mapped and the mirrored second touch operation event occurring in the second position is obtained and then distributed to the first user interface for performing the corresponding operation. On the one hand, by mapping the position in the operable area, the operation on the area which is inoperable with one hand of the user is realized, avoiding the click-help from another hand and improving the simplicity and efficiency of the touch operation. On the other hand, since there is no need to perform transformation operations such as zooming, moving, etc. on the first user interface, the user can operate directly, reducing the probability of an error due to the position error after the transformation of zooming, moving, etc.

Figure 5:
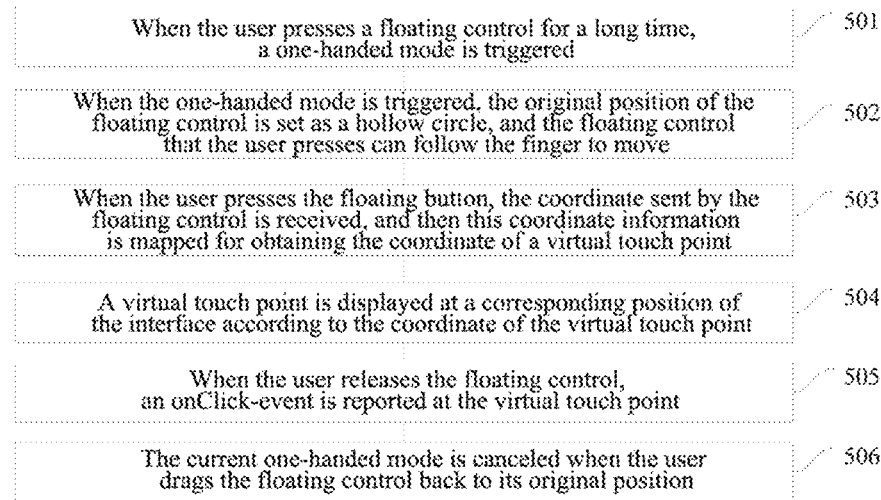
FIG. 5 is an exemplary flowchart of a touch operation provided by some embodiments of the present disclosure.

In order to enable those skilled in the art to better understand the embodiments of the present disclosure, with reference to FIG. 5, some examples will be employed to describe the touch operation method of the present disclosure.

In step 501, as shown in FIG. 2A, the floating control interaction is designed as a semi-transparent button floated at the uppermost layer of the basic operation interface. When the user presses the floating control for a long time, a one-handed mode is triggered.

In step 502, as shown in FIG. 2C, when the one-handed mode is triggered, the original position of the floating control is set as a hollow circle, and the floating control that the user presses can follow the finger to move.

In step 503, when the user presses the floating button, the coordinate sent by the floating control is received, i.e., the coordinate of the true touch point, and then this coordinate information is mapped for obtaining the coordinate of the virtual touch point.

In step 504, as shown in FIG. 2C, a virtual touch point is displayed at a corresponding position of the interface according to the coordinate of the virtual touch point.

In step 505, when the user releases the floating control, an onClick-event is reported at the virtual touch point, which is equivalent to that, the user performs a clicking operation at the virtual touch point.

In step 506, the current one-handed mode is canceled when the user drags the floating control back to its original position (i.e., the hollow circle).

It should be noted that, the method embodiments are all described as a series of actions for brevity, but those skilled in the art will appreciate that the embodiments of the present disclosure are not limited by the described act sequence, some steps may be performed in other sequences or even simultaneously, according to the embodiments of the present disclosure. Secondly, those skilled in the art will also appreciate that the embodiments described in the specification are considered to be preferred embodiments, the actions described are not necessary for the embodiments of the present disclosure.

Figure 6:
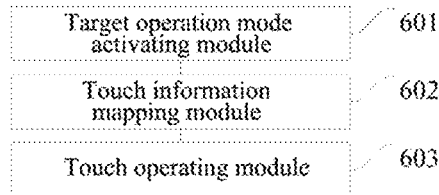
FIG. 6 is a structural block view of an apparatus for performing a touch operation in a mobile device provided by some embodiments of the present disclosure.

Referring to FIG. 6, which is a structural block view of an apparatus for performing a touch operation in a mobile device provided by some embodiments of the present disclosure. The apparatus may include the following modules:
   a target operation mode activating module 601, configured to activate a target operation mode when monitoring a first target operation in a first user interface;
   a touch information mapping module 602, configured to map a first touch operation event occurring in a first position to a second touch operation event occurring in a second position in the target operation mode;

a touch operating module 603, configured to report the second touch operation event occurring in the second position to the first user interface for performing a corresponding operation.

In an embodiment of the present disclosure, the touch information mapping module 602 may include the following sub-modules:

a second user interface loading sub-module, configured to load a second user interface on the first user interface;

a first touch operation event receiving sub-module, configured to receive the first touch operation event occurring at the first position in the second user interface;

a position mapping sub-module, configured to map the first position to the second position;

a touch operation event mapping sub-module, configured to map the first touch operation event to the second touch operation event.

In an embodiment of the present disclosure, the second user interface includes a plurality of divided areas, and the divided areas include a touch area and a mapping area.

The position mapping sub-module may include the following units:

a touch area determining unit, configured to determine a touch area to which the first position belongs;

a ratio relation querying unit, configured to query a ratio relation between the touch area and a screen size;

a ratio mapping unit, configured to map the first position to the second position in the mapping area according to the ratio relation.

In an embodiment of the present disclosure, the first position includes a first abscissa and a first ordinate, the second position includes a second abscissa and a second ordinate, and the ratio relation includes a height ratio.

The touch area determining unit may include the following sub-units:

a first determining sub-unit, configured to determine that the first position belongs to the touch area when the first position is within the touch area;

or, a position projecting sub-unit, configured to, when the first position is within a divided area but not within a touch area in the divided area, project the first position onto the boundary of the touch area;

a second determining sub-unit, configured to determine that the first position belongs to the touch area.

In one example of an embodiment of the present disclosure, the ratio mapping unit may include sub-units as follows:

a first assigning sub-unit, configured to assign the value of first abscissa to the second abscissa when the touch area is the divided area;

a second assigning sub-unit, configured to assigning the sum of the value of first ordinate value and a height scale value to the second ordinate;

or, a coordinate mapping sub-unit, configured to, when the touch area is a partial area in the divided area, map the first abscissa to a third abscissa of the divided area and map the first ordinate to a third ordinate of the divided area;

a third assigning sub-unit, configured to assign the value of third abscissa to the second abscissa;

a fourth assigning sub-unit, configured to assign the sum of the value of third ordinate and the height scale value to the second ordinate;

where the height scale value is a product of the screen height and the height ratio.

In an embodiment of the present disclosure, the apparatus may further include the following modules:

a prompt information displaying module, configured to display position prompt information at the second position.

In an embodiment of the present disclosure, the apparatus may further include the following modules:

a target operation mode withdrawing unit, configured to withdraw the target operation mode when monitoring a second target operation.

In an implementation, the first target operation is a specified operation for a floating control;

the first touch operation event occurs in the floating control;

the second target operation includes the floating control returning back to the original position where the floating control is located when the target operation mode is activated.

For apparatus embodiments, which are substantially similar to method embodiments, the description is relatively simple, and the relevant aspects can be seen in the partial description of the method embodiments for reference.

An embodiment of the present disclosure also provides an apparatus for performing a touch operation in a mobile device, including:

a memory, configured to store the instructions; a processor coupled to the memory, configured to execute the instructions stored in the memory, and also configured to:

activate a target operation mode when monitoring a first target operation in a first user interface;

map a first touch operation event occurring in the first position to a second touch operation event occurring in a second position in the target operation mode; and report the second touch operation event occurring in the second position to the first user interface for performing a corresponding operation.

The processor is further configured to:

load a second user interface at an upper layer of the first user interface;

receive the first touch operation event occurring at the first position in the second user interface;

map the first position to the second position, where the second position is located on the second user interface, and the second user interface is transparent or translucent; and map the first touch operation event to the second touch operation event.

The second user interface includes a plurality of divided areas, and the divided areas include a touch area and a mapping area.

The processor is further configured to:

determine a touch area to which the first position belongs;

query a ratio relation between the touch area and a screen size; and map the first position to the second position in the mapping area according to the ratio relation.

When the first position is within the touch area, it is determined that the first position belongs to the touch area.

The processor is further configured to, when the first position is within a divided area but not within a touch area in the divided area, project the first position to a boundary of the touch area;

determine that the first position belongs to the touch area where the boundary is located.

In an embodiment, the first position includes a first abscissa and a first ordinate, the second position includes a second abscissa and a second ordinate, and the ratio relation includes a height ratio.

The processor is further configured to:
when the touch area is a divided area, assign the value of first abscissa to the second abscissa;
assign the sum of the value of first ordinate and a height scale value to the second ordinate, where the height scale value is the product of the screen height and the height ratio.

In an embodiment, the first position includes the first abscissa and the first ordinate, the second position includes the second abscissa and the second ordinate, and the ratio relation includes the height ratio.

The processor is further configured to:
map the first abscissa to a third abscissa of the divided area and map the first ordinate to a third ordinate of the divided area when the touch area is a partial area of the divided area;
assign the value of third abscissa to the second abscissa;
assign the sum of the value of third ordinate and a height scale value to the second ordinate;
where the height scale value is the product of the screen height and the height ratio.

The processor is further configured to:
map the second position to a third position of the first user interface;
map the second touch operation event to a third touch operation event occurring at the third position; and
operate an icon on the third position according to the third touch operation event.

The processor is further configured to:
display position prompt information in the second position.

The processor is further configured to:
withdraw the target operation mode when monitoring a second target operation.

The first target operation is a specified operation for a floating control;
the first touch operation event occurs in the floating control, where the first touch operation event includes an operation of releasing the floating control;
the second target operation includes the floating control returning back to the original position where the floating control is floated when activating the target operation mode.

The processor in the apparatus provided in the embodiments of the present disclosure may also be configured to perform any of the methods provided by the preceding embodiments of the present disclosure for performing a touch operation in a mobile device, and the implementation principles are similar which will not be repeated.

The various embodiments in the present specification are described in a progressive manner, with each embodiment focusing on the differences from other embodiments, and the similar portions among the various embodiments can be referred to each other.

It should be understood by those skilled in the art that embodiments of the present disclosure may be provided as a method, an apparatus, or a computer program product. Thus, the embodiments of the present disclosure may take the form of a fully hardware embodiment, a fully software embodiment, or an embodiment with combination of the software and hardware. Furthermore, the embodiments of the present disclosure may take the form of a computer program product implemented on one or more computer usable storage media (including but not limited to a magnetic disk storage, a CD-ROM, an optical storage, etc.) containing computer usable program code therein.

The embodiments of the present disclosure are described with reference to a method, a terminal device (system), a flowchart and/or block view of a computer program product according to an embodiment of the present disclosure. It should be understood that each flow and/or block in the flowchart and/or block view, as well as combination of flows and/or blocks in the flowchart and/or block view, may be implemented by using the computer program instructions. These computer program instructions may be provided to a processor of a general purpose computer, a special purpose computer, an embedded processor, or other programmable data processing terminal devices to produce a machine, which can produce an apparatus for implementing the functions specified in one or more flows in the flowchart and/or one or more blocks in the block view through the instructions executed by a processor of a computer or other programmable data processing terminal devices.

These computer program instructions may also be stored in a computer readable memory capable of directing a computer or other programmable data processing terminal devices to operate in a particular manner, such that the instructions stored in the computer readable memory can produce a product containing an instruction apparatus which implements the functions specified in one or more flows in the flowchart and/or one or more blocks in the block view.

These computer program instructions may also be loaded to a computer or other programmable data processing terminal devices, enabling a series of operational steps to be performed on a computer or other programmable terminal devices for producing the computer-implemented processing, such that the instructions performed on the computer or other programmable data processing terminal devices can provide the steps for implementing the functions specified in one or more flows in the flowchart and/or one or more blocks in the block view.

While the preferred embodiments of the present disclosure have been described, those skilled in the art will be able to make other alterations and modifications to these embodiments once they become aware of the basic inventive concepts. Therefore, it is intended that the appended claims are interpreted as including the preferred embodiments as well as all changes and modifications that fall within the scope of the embodiments of the present disclosure.

Finally, it should also be noted that in the present disclosure, the relation terms, such as first and second, etc. are merely used to distinguish one entity or operation from another entity or operation, without necessarily requiring or implying that there is any such actual relationship or sequence among these entities or operations. Furthermore, the terms "comprising", "including" or any other variations thereof, are intended to encompass a non-exclusive inclusion, such that a process, a method, an object, or a terminal device that includes a series of elements may include not only those elements but also the elements un-listed, as well as the elements that are inherent to such a process, a method, an object, or a terminal device. The elements defined by the statement "comprising a . . . " without further limitations, do not preclude the presence of additional identical elements in the process, method, object, or terminal device that includes the elements.

A detailed description of a method for performing a touch operation in a mobile device and an apparatus for performing a touch operation in a mobile device are provided in the present disclosure, applying the specific examples for illustrating the principles and implementations of the present disclosure and assisting in understanding the method and its core idea of the present disclosure; meanwhile, for those skilled in the art, the implementation and application scope may change according to the idea of the present disclosure. In summary, the specification should not to be understood as a limitation to the present disclosure.

What is claimed is:

1. A method for performing a touch operation in a mobile device, comprising:
    activating a target operation mode when monitoring a first target operation in a first user interface;
    mapping a first touch operation event occurring in a first position to a second touch operation event occurring in a second position in the target operation mode; and
    reporting the second touch operation event occurring in the second position to the first user interface for performing a corresponding operation,
    wherein the mapping a first touch operation event occurring in a first position to a second touch operation event occurring in a second position comprises:
    loading a second user interface at an upper layer of the first user interface;
    receiving a first touch operation event occurring in a first position in the second user interface;
    mapping the first position to a second position, wherein the second position is located in the second user interface; and
    mapping the first touch operation event to a second touch operation event,
    wherein the second user interface comprises a plurality of divided areas, the divided areas comprise a touch area and a mapping area;
    wherein the mapping the first position to a second position comprises:
    determining a touch area to which the first position belongs;
    querying a ratio relation between the touch area and a screen size; and
    mapping the first position to a second position located in the mapping area according to the ratio relation,
    wherein the first position comprises a first abscissa and a first ordinate, the second position comprises a second abscissa and a second ordinate, and the ratio relation comprises a height ratio;
    the mapping the first position to a second position located in the mapping area comprises:
    assigning a value of the first abscissa to the second abscissa when the touch area is a divided area; and
    assigning a sum of a value of the first ordinate and a height scale value to the second ordinate, wherein the height scale value is a product of a screen height and the height ratio.

2. The method according to claim 1, wherein the second user interface is transparent or translucent.

3. The method according to claim 1, wherein the determining a touch area to which the first position belongs comprises:
    when the first position is located within a touch area, determining that the first position belongs to the touch area.

4. The method according to claim 1, wherein the determining a touch area to which the first position belongs comprises:
    when the first position is located within a divided area but not within a touch area in the divided area, projecting the first position onto a boundary of the touch area; and
    determining that the first position belongs to the touch area where the boundary is located.

5. The method according to claim 1, wherein the reporting the second touch operation event occurring in the second position to the first user interface for performing a corresponding operation, comprises:
    mapping the second position to a third position of the first user interface;
    mapping the second touch operation event to a third touch operation event occurring in the third position; and
    operating an icon in the third position according to the third touch operation event.

6. The method according to claim 1, further comprising:
    displaying position prompt information in the second position.

7. The method according to claim 1, further comprising:
    withdrawing the target operation mode when monitoring a second target operation.

8. The method according to claim 7, wherein:
    the first target operation is a specified operation for a floating control;
    the first touch operation event occurs in the floating control, wherein the first touch operation event comprises an operation of releasing the floating control;
    the second target operation comprises the floating control returning back to an original position where the floating control is located when the target operation mode is activated.

9. An apparatus for performing a touch operation in a mobile device, comprising:
    a memory, configured to store instructions; a processor coupled to the memory, configured to execute the instructions stored in the memory, and the processor is configured to:
    activate a target operation mode when monitoring a first target operation in a first user interface;
    map a first touch operation event occurring in a first position to a second touch operation event occurring in a second position in the target operation mode; and
    report the second touch operation event occurring in the second position to the first user interface for performing a corresponding operation,
    wherein the processor is further configured to:
    load a second user interface at an upper layer of the first user interface;
    receive a first touch operation event occurring at a first position in the second user interface;
    map the first position to a second position, wherein the second position is located in the second user interface; and
    map the first touch operation event to a second touch operation event,
    wherein the second user interface comprises a plurality of divided areas, the divided areas comprise a touch area and a mapping area;
    wherein the processor is also configured to:
    determine a touch area to which the first position belongs;
    query a ratio relation between the touch area and a screen size; and
    map the first position to a second position in the mapping area according to the ratio relation,
    wherein the first position comprises a first abscissa and a first ordinate, the second position comprises a second abscissa and a second ordinate, and the ratio relation comprises a height ratio; and
    wherein the processor is further configured to:

assign a value of the first abscissa to the second abscissa when the touch area is a divided area; and assign a sum of a value of the first ordinate and a height scale value to the second ordinate, wherein the height scale value is a product of a screen height and the height ratio.

10. The apparatus according to claim 9, wherein the second user interface is transparent or translucent.

11. The apparatus according to claim 9, wherein the processor is further configured to:

map the second position to a third position of the first user interface;

map the second touch operation event to a third touch operation event occurring in the third position; and operate an icon in the third position according to the third touch operation event.

12. The apparatus according to claim 9, wherein the processor is further configured to:

display position prompt information in the second position.

13. The apparatus according to claim 9, wherein the processor is further configured to:

withdraw the target operation mode when monitoring a second target operation.

14. The apparatus according to claim 13, wherein:

the first target operation is a specified operation for a floating control;

the first touch operation event occurs in the floating control, wherein the first touch operation event comprises an operation of releasing the float control;

the second target operation comprises the floating control returning back to an original position where the floating control is located when the target operation mode is activated.

* * * * *